(12) United States Patent
Gokam et al.

(10) Patent No.: US 12,039,195 B2
(45) Date of Patent: Jul. 16, 2024

(54) PROVISIONING ZONED STORAGE DEVICES TO SEQUENTIAL WORKLOADS

(71) Applicant: EMC IP Holding Company LLC, Hopkinton, MA (US)

(72) Inventors: Kurumurthy Gokam, Bangalore (IN); Kundan Kumar, Bangalore (IN); Remesh Parakunnath, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/216,908

(22) Filed: Mar. 30, 2021

(65) Prior Publication Data

US 2022/0317922 A1 Oct. 6, 2022

(51) Int. Cl.
*G06F 12/00* (2006.01)
*G06F 3/06* (2006.01)

(52) U.S. Cl.
CPC .......... *G06F 3/0659* (2013.01); *G06F 3/0613* (2013.01); *G06F 3/0649* (2013.01); *G06F 3/0653* (2013.01); *G06F 3/067* (2013.01); *G06F 3/0683* (2013.01)

(58) Field of Classification Search
USPC ........................................................ 711/154
See application file for complete search history.

(56) References Cited

U.S. PATENT DOCUMENTS

| | | | |
|---|---|---|---|
| 9,128,949 B2 * | 9/2015 | Lipcon | G06F 12/0808 |
| 9,703,664 B1 | 7/2017 | Alshawabkeh et al. | |
| 9,983,795 B1 * | 5/2018 | Naamad | G06F 3/0629 |
| 10,754,574 B1 * | 8/2020 | Jo | G06F 3/0613 |
| 11,287,989 B2 * | 3/2022 | Mishra | G06F 3/0631 |
| 2011/0119679 A1 * | 5/2011 | Muppirala | G06F 3/0611 718/105 |
| 2012/0317355 A1 | 12/2012 | Ishizaki et al. | |
| 2017/0024160 A1 * | 1/2017 | Feldman | G06F 3/064 |
| 2017/0046098 A1 | 2/2017 | Yang et al. | |

(Continued)

OTHER PUBLICATIONS

U.S. Appl. No. 17/216,915 entitled, "Migrating Data of Sequential Workloads to Zoned Storage Devices," filed concurrently herewith.

(Continued)

*Primary Examiner* — Mohamed M Gebril
(74) *Attorney, Agent, or Firm* — Ryan, Mason & Lewis, LLP

(57) ABSTRACT

Techniques are provided for provisioning zoned storage devices to sequential workloads. One method comprises obtaining a sequentiality classification of at least one workload of an application associated with a storage system comprising a plurality of zoned storage devices; and provisioning at least one of the zoned storage devices for storing the data of the at least one workload in response to the at least one workload being classified as a sequential workload. A sequentiality classification of a workload (e.g., as a sequential workload or a random workload) can be determined by: (i) evaluating the application name and/or application type of an application, (ii) learning input-output workload patterns, such as sequential read/write operations or random read/write operations, and/or (iii) detecting the application access mode to persistent volumes, such as a sequential write access mode.

20 Claims, 9 Drawing Sheets

(56) References Cited

U.S. PATENT DOCUMENTS

| | | | |
|---|---|---|---|
| 2017/0242583 A1* | 8/2017 | Yang | G06F 3/0679 |
| 2017/0242588 A1* | 8/2017 | Ujibashi | G06F 3/0604 |
| 2018/0121133 A1* | 5/2018 | Bakke | G06F 12/0868 |
| 2019/0114276 A1 | 4/2019 | Hodes et al. | |
| 2021/0116982 A1* | 4/2021 | Khanna | G06F 1/3287 |
| 2021/0255768 A1 | 8/2021 | Majerus et al. | |
| 2021/0318820 A1* | 10/2021 | Jin | G06F 3/061 |
| 2022/0029886 A1* | 1/2022 | Hameiri | H04L 41/0856 |
| 2022/0156116 A1* | 5/2022 | Yardeni | G06F 3/0653 |
| 2022/0171540 A1* | 6/2022 | Lublin | G06F 3/0616 |
| 2022/0276789 A1* | 9/2022 | Bert | G06F 12/0246 |
| 2022/0318050 A1* | 10/2022 | Gokam | G06F 3/0647 |

OTHER PUBLICATIONS https://www.ibm.com/support/knowledgecenter/en/SS5R93_5.3.1/com.ibm.spectrum.sc.doc/fqz0_c_provisioning_storage.html, downloaded on Mar. 22, 2021.

https://zonedstorage.io/introduction/zns/, downloaded on Mar. 22, 2021.

https://kubernetes.io/docs/concepts/storage/persistent-volumes/, downloaded on Mar. 22, 2021.

\* cited by examiner

WORKLOAD TYPE CLASSIFICATION TABLE 300

| FILE SYSTEM IDENTIFIER/ APPLICATION IDENTIFIER | WORKLOAD TYPE |
|---|---|
| APPLICATION A | SEQUENTIAL |
| APPLICATION B | RANDOM |
| ... | ... |
| APPLICATION Q | SEQUENTIAL |

FIG. 3

PROVISIONING ZONED STORAGE DEVICES TO SEQUENTIAL WORKLOADS

CROSS-REFERENCE TO RELATED APPLICATION(S)

The present application is related to U.S. patent application Ser. No. 17/216,915, filed Mar. 30, 2021, entitled "Migrating Data of Sequential Workloads to Zoned Storage Devices," incorporated by reference herein in its entirety.

FIELD

The field relates generally to information processing techniques and more particularly, to storage in such systems.

BACKGROUND

Solid State Drives (SSDs) may implement a log-structured data structure, where data is written sequentially to a storage media. Zoned storage devices comprise storage devices with an address space that is divided into zones, where each zone is written sequentially (e.g., starting from the beginning of a zone) and reset explicitly. Zoned SSDs, for example, comprise a zoned storage device interface that allows a given SSD and host to collaborate on data placement, such that data can be aligned to the physical media of the SSD.

A need exists for improved techniques for storing data on zoned storage devices.

SUMMARY

In one embodiment, a method comprises obtaining a sequentiality classification of at least one workload of an application associated with a storage system comprising a plurality of zoned storage devices; and provisioning at least one zoned storage device of the plurality of zoned storage devices for storing the data of the at least one workload in response to the at least one workload being classified as a sequential workload.

In some embodiments, the plurality of zoned storage devices comprises one or more zoned storage volumes and the application comprises one or more processes each associated with a given one of the at least one workload and wherein the data associated with a given workload is stored on a corresponding one of the one or more zoned storage volumes. The sequentiality classification of the at least one workload can be obtained based at least in part on one or more of: (i) a name of the application, (ii) an application type of the application, (iii) a monitoring of the at least one workload in an input/output path, and (iv) an access mode of the at least one workload to persistent storage volumes obtained from a configuration file associated with the application.

Other illustrative embodiments include, without limitation, apparatus, systems, methods and computer program products comprising processor-readable storage media.

BRIEF DESCRIPTION OF THE DRAWINGS

FIG. 3 illustrates an exemplary workload type classification table to maintain a workload type corresponding to each of the applications of FIG. 1, according to one or more embodiments of the disclosure;

DETAILED DESCRIPTION

Figure 1:
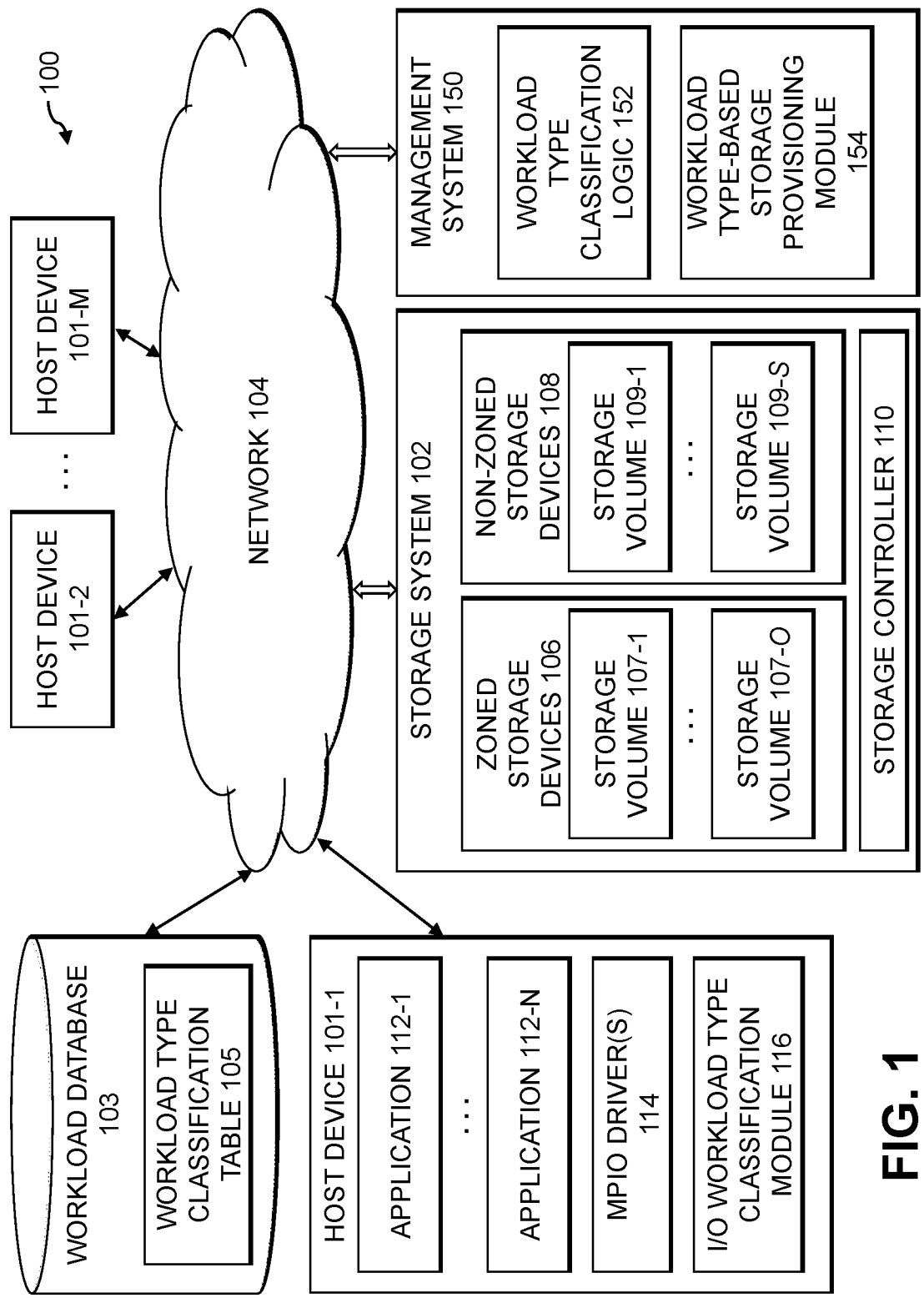
FIG. 1 shows an information processing system configured for provisioning zoned storage devices to sequential workload, in accordance with an illustrative embodiment.

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for provisioning zoned storage devices (ZSDs) (e.g., zoned storage volumes) to sequential workloads.

As noted above, SSDs implement a log-structured data structure, where data is written sequentially to the media. ZSDs comprise storage devices with an address space that is divided into zones, where each zone is written sequentially (e.g., starting from the beginning of a zone) and reset explicitly. Zoned SSDs, for example, comprise a ZSD interface that allows a given SSD and host to collaborate on data placement, such that data can be aligned to the physical media of the SSD, improving the overall performance and increasing the capacity that can be exposed to the host. A zoned namespace exposes a set of zones.

In one or more embodiments, a ZSD (e.g., a zoned logical unit (LUN) or another zoned storage volume) is dynamically provisioned for an application based at least in part on the workload type in a ZSD storage environment, such as a zoned NVM Express (NVMe) storage environment. For example, a ZSD can be provisioned to applications having a sequential workload (and a ZSD may not be provisioned to applications having a random workload).

In some embodiments, techniques are provided for classifying, characterizing and/or quantifying the sequentiality of input/output (I/O) workloads and for dynamically provisioning ZSDs to sequential workloads. Among other benefits, provisioning ZSDs to an application having a sequential workload improves the overall performance of a storage system. In at least one embodiment, discussed further below, the workload type (e.g., a sequential workload or a random workload) is detected by: (i) evaluating the application name and/or application type of an application, (ii) analyzing I/O workload patterns, such as sequential read/write operations or random read/write operations, and/or (iii) detecting the application access mode to persistent volumes, such as a sequential write access mode.

One or more aspects of the disclosure recognize that storage provisioning decisions can be adaptive to the sequentiality of the workloads. In one representative embodiment, a pool of ZSDs is maintained, sequential workloads are identified and ZSDs are provisioned only to applications having sequential workloads. As used herein, the term "sequential workload" shall be broadly construed to encompass any workload that satisfies one or more pre-defined sequentiality criteria, such as any workload that has a percentage of sequential I/O operations that exceed a defined threshold. Thus, a sequential workload need not have only sequential I/O operations.

In one or more embodiments, the disclosed techniques for provisioning ZSDs to sequential workloads create a pool of persistent volumes (PVs) based at least in part on detecting ZSDs. A zoned namespace LUN, for example, can be detected by obtaining zone information from the ZSD, such as an NVMe device. Such zoned information can be obtained, for example, by sending NVMe-specific commands to read the zone information in some embodiments.

FIG. 1 shows an information processing system 100 configured in accordance with an illustrative embodiment. The information processing system 100 comprises a plurality of host devices 101-1, 101-2, ... 101-M, collectively referred to herein as host devices 101, a storage system 102 and a management system 150. The host devices 101 are configured to communicate with the storage system 102 and management system 150 over a network 104. The host devices 101 illustratively comprise servers or other types of computers of an enterprise computer system, cloud-based computer system or other arrangement of multiple compute nodes associated with respective users. Host device 101-1 is representative of one or more of the host devices 101.

For example, the host devices 101 in some embodiments illustratively provide compute services such as execution of one or more applications on behalf of each of one or more users associated with respective ones of the host devices. Such applications illustratively generate I/O operations that are processed by the storage system 102. The term "input-output" as used herein refers to at least one of input and output. For example, I/O operations may comprise write requests and/or read requests directed to logical addresses of a particular logical storage volume of the storage system 102. These and other types of I/O operations are also generally referred to herein as I/O requests.

As shown in FIG. 1, the representative host device 101-1 executes one or more applications 112-1 through 112-N, collectively referred to herein as applications 112. One or more multi-path input-output (MPIO) drivers 114 are configured to control delivery of I/O operations from the host device 101 to the storage system 102 over selected ones of a plurality of paths through the network 104. The paths are illustratively associated with respective initiator-target pairs, with each of a plurality of initiators of the initiator-target pairs comprising a corresponding host bus adaptor (HBA) of the host device, and each of a plurality of targets of the initiator-target pairs comprising a corresponding port of the storage system 102.

In addition, the representative host device 101-1 comprises an I/O workload type classification module 116 that detects the workload type (e.g., a sequential workload or a random workload) of at least one workload, in at least some embodiments, as discussed further below in conjunction with FIGS. 4 through 6. In some embodiments, the functionality of the I/O workload type classification module 116 may be included as part of the MPIO driver(s) 114 associated with the applications 112.

The host devices 101 and/or applications 112 are configured to interact over the network 104 with the storage system 102. Such interaction illustratively includes generating I/O operations, such as write and read requests, and sending such requests over the network 104 for processing by the storage system 102.

The storage system 102 illustratively comprises processing devices of one or more processing platforms. For example, the storage system 102 can comprise one or more processing devices each having a processor and a memory, possibly implementing virtual machines and/or containers, although numerous other configurations are possible.

The storage system 102 can additionally or alternatively be part of cloud infrastructure such as an Amazon Web Services (AWS) system. Other examples of cloud-based systems that can be used to provide at least portions of the storage system 102 include Google Cloud Platform (GCP) and Microsoft Azure.

The storage system 102 comprises a plurality of ZSDs 106, a plurality of non-zoned storage devices 108 and an associated storage controller 110. The ZSDs 106 store data of one or more storage volumes 107-1 through 107-O and the non-zoned storage devices 108 store data of one or more storage volumes 109-1 through 109-S. The storage volumes 107, 109 illustratively comprise respective LUNs or other types of logical storage volumes. The term "storage volume" as used herein is intended to be broadly construed, and should not be viewed as being limited to any particular format or configuration.

The storage controller 110 and/or the storage system 102 may further include one or more additional modules and other components typically found in conventional implementations of storage controllers and storage systems, although such additional modules and other components are omitted from the figure for clarity and simplicity of illustration.

In the example of FIG. 1, the representative management system 150 comprises workload type classification logic 152 and a workload type-based storage provisioning module 154. In one or more embodiments, the management system 150 manages one or more host devices 101 and one or more storage systems 102. In at least some embodiments, the workload type classification logic 152 detects the workload type (e.g., a sequential workload or a random workload) of at least one workload, as discussed further below in conjunction with FIGS. 4 through 6. The exemplary workload type-based storage provisioning module 154 automatically provisions a ZSD 106 for an application having a sequential workload type, as discussed further below in conjunction with FIGS. 4 through 6.

Additionally, the host devices 101, the storage system 102 and/or management system 150 can have an associated workload database 103 configured to store a workload type classification table 105 that indicates, a workload type (e.g., sequential or random workload) for each application, as discussed further below in conjunction with FIG. 3. The workload type classification table 105 in the present embodiment can be implemented using one or more storage systems associated with the host devices 101 and/or the storage system 102, or the workload type classification table 105 can be stored in the database 103 and accessed over the network.

Such storage systems can comprise any of a variety of different types of storage including network-attached storage (NAS), storage area networks (SANs), direct-attached storage (DAS) and distributed DAS, as well as combinations of these and other storage types, including software-defined storage.

The host devices 101, the storage system 102 and/or the management system 150 may be implemented on a common processing platform, or on separate processing platforms. The host devices 101 are illustratively configured to write data to and read data from the storage system 102 in accordance with applications 112 executing on those host devices for system users.

The term "user" herein is intended to be broadly construed so as to encompass numerous arrangements of human, hardware, software or firmware entities, as well as combinations of such entities. Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The ZSDs 106 and/or the non-zoned storage devices 108 of the storage system 102 illustratively comprise solid state drives (SSDs). Such SSDs are implemented using non-volatile memory (NVM) devices such as flash memory. Other types of NVM devices that can be used to implement at least a portion of the ZSDs 106 include non-volatile RAM (NVRAM), phase-change RAM (PC-RAM), magnetic RAM (MRAM), resistive RAM, spin torque transfer magneto-resistive RAM (STT-MRAM), and Intel Optane™ devices based on 3D XPoint™ memory. These and various combinations of multiple different types of NVM devices may also be used. For example, hard disk drives (HDDs) can be used in combination with or in place of SSDs or other types of NVM devices in the storage system 102.

It is therefore to be appreciated that numerous different types of ZSDs 106 and/or the non-zoned storage devices 108 can be used in storage system 102 in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises HDDs. The particular storage devices used in a given storage tier may be varied in other embodiments, and multiple distinct storage device types may be used within a single storage tier. The term "storage device" as used herein is intended to be broadly construed, so as to encompass, for example, SSDs, HDDs, flash drives, hybrid drives or other types of storage devices.

In some embodiments, the storage system 102 illustratively comprises a scale-out all-flash distributed content addressable storage (CAS) system, such as an XtremIO™ storage array from Dell Technologies. A wide variety of other types of distributed or non-distributed storage arrays can be used in implementing the storage system 102 in other embodiments, including by way of example one or more Unity™ or PowerMax™ storage arrays, commercially available from Dell Technologies. Additional or alternative types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

The term "storage system" as used herein is therefore intended to be broadly construed, and should not be viewed as being limited to particular storage system types, such as, for example, CAS systems, distributed storage systems, or storage systems based on flash memory or other types of NVM storage devices. A given storage system as the term is broadly used herein can comprise, for example, any type of system comprising multiple storage devices, such as network-attached storage (NAS), storage area networks (SANs), direct-attached storage (DAS) and distributed DAS, as well as combinations of these and other storage types, including software-defined storage.

In some embodiments, communications between the host devices 101 and the storage system 102 comprise Small Computer System Interface (SCSI) or Internet SCSI (iSCSI) commands. Other types of SCSI or non-SCSI commands may be used in other embodiments, including commands that are part of a standard command set, or custom commands such as a "vendor unique command" or VU command that is not part of a standard command set. The term "command" as used herein is therefore intended to be broadly construed, so as to encompass, for example, a composite command that comprises a combination of multiple individual commands. Numerous other commands can be used in other embodiments.

For example, although in some embodiments certain commands used by the host devices 101 to communicate with the storage system 102 illustratively comprise SCSI or iSCSI commands, other embodiments can implement I/O operations utilizing command features and functionality associated with NVMe, as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF, and NVMe over Transmission Control Protocol (TCP), also referred to as NVMe/TCP.

The storage system 102 in some embodiments is implemented as a distributed storage system, also referred to herein as a clustered storage system, comprising a plurality of storage nodes. Each of at least a subset of the storage nodes illustratively comprises a set of processing modules configured to communicate with corresponding sets of processing modules on other ones of the storage nodes. The sets of processing modules of the storage nodes of the storage system 102 in such an embodiment collectively comprise at least a portion of the storage controller 110 of the storage system 102. For example, in some embodiments the sets of processing modules of the storage nodes collectively comprise a distributed storage controller of the distributed storage system 102. A "distributed storage system" as that term is broadly used herein is intended to encompass any storage system that, like the storage system 102, is distributed across multiple storage nodes.

It is assumed in some embodiments that the processing modules of a distributed implementation of storage controller 110 are interconnected in a full mesh network, such that a process of one of the processing modules can communicate with processes of any of the other processing modules. Commands issued by the processes can include, for example, remote procedure calls (RPCs) directed to other ones of the processes.

The sets of processing modules of a distributed storage controller illustratively comprise control modules, data modules, routing modules and at least one management module. Again, these and possibly other modules of a distributed storage controller are interconnected in the full mesh network, such that each of the modules can communicate with each of the other modules, although other types of networks and different module interconnection arrangements can be used in other embodiments.

A management module of the distributed storage controller in this embodiment may more particularly comprise a system-wide management module. Other embodiments can include multiple instances of the management module implemented on different ones of the storage nodes. It is therefore assumed that the distributed storage controller comprises one or more management modules.

A wide variety of alternative configurations of nodes and processing modules are possible in other embodiments. Also, the term "storage node" as used herein is intended to be broadly construed, and may comprise a node that implements storage control functionality but does not necessarily incorporate storage devices.

Communication links may be established between the various processing modules of the distributed storage controller using well-known communication protocols such as TCP/IP and remote direct memory access (RDMA). For example, respective sets of IP links used in data transfer and corresponding messaging could be associated with respective different ones of the routing modules.

Each storage node of a distributed implementation of storage system 102 illustratively comprises a CPU or other type of processor, a memory, a network interface card (NIC) or other type of network interface, and a subset of the ZSDs 106, possibly arranged as part of a disk array enclosure (DAE) of the storage node. These and other references to "disks" herein are intended to refer generally to storage devices, including SSDs, and should therefore not be viewed as limited to spinning magnetic media.

The storage system 102 in the FIG. 1 embodiment is assumed to be implemented using at least one processing platform, with each such processing platform comprising one or more processing devices, and each such processing device comprising a processor coupled to a memory. Such processing devices can illustratively include particular arrangements of compute, storage and network resources. As indicated previously, the host devices 101 may be implemented in whole or in part on the same processing platform as the storage system 102 or on a separate processing platform.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the host devices 101 and the storage system 102 to reside in different data centers. Numerous other distributed implementations of the host devices and the storage system 102 are possible.

Additional examples of processing platforms utilized to implement host devices 101, storage system 102 and/or management system 150 in illustrative embodiments will be described in more detail below in conjunction with FIGS. 8 and 9.

It is to be appreciated that these and other features of illustrative embodiments are presented by way of example only, and should not be construed as limiting in any way.

Accordingly, different numbers, types and arrangements of one or more system components such as host devices 101, MPIO drivers 114, I/O workload type classification module 116, storage system 102, network 104, ZSDs 106, storage volumes 107, non-zoned storage devices 108, storage volumes 109, storage controller 110, management system 150, workload type classification logic 152 and workload type-based storage provisioning module 154 can be used in other embodiments.

It should be understood that the particular sets of modules, logic and other components implemented in the system 100 as illustrated in FIG. 1 are presented by way of example only. In other embodiments, only subsets of these components, or additional or alternative sets of components, may be used, and such components may exhibit alternative functionality and configurations.

An exemplary process utilizing I/O workload type classification module 116, workload type classification logic 152 and/or workload type-based storage provisioning module 154 will be described in more detail with reference to FIGS. 4-6.

A converged infrastructure or an application cluster, which uses, for example, NAS or SANs, can run a large number and variety of applications. Each of these applications can have different levels of importance or criticality in the application cluster. In these situations, applications may be served by storage solutions in the backend (such as, for example ScaleIO™) which is accessed by the cluster nodes over SAN or NAS. When an application running on a cluster accesses a file, the file access delay on the storage array directly affects application performance. In these situations, recently accessed data may be cached in order to give quick repeat access to the same data.

Figure 2:
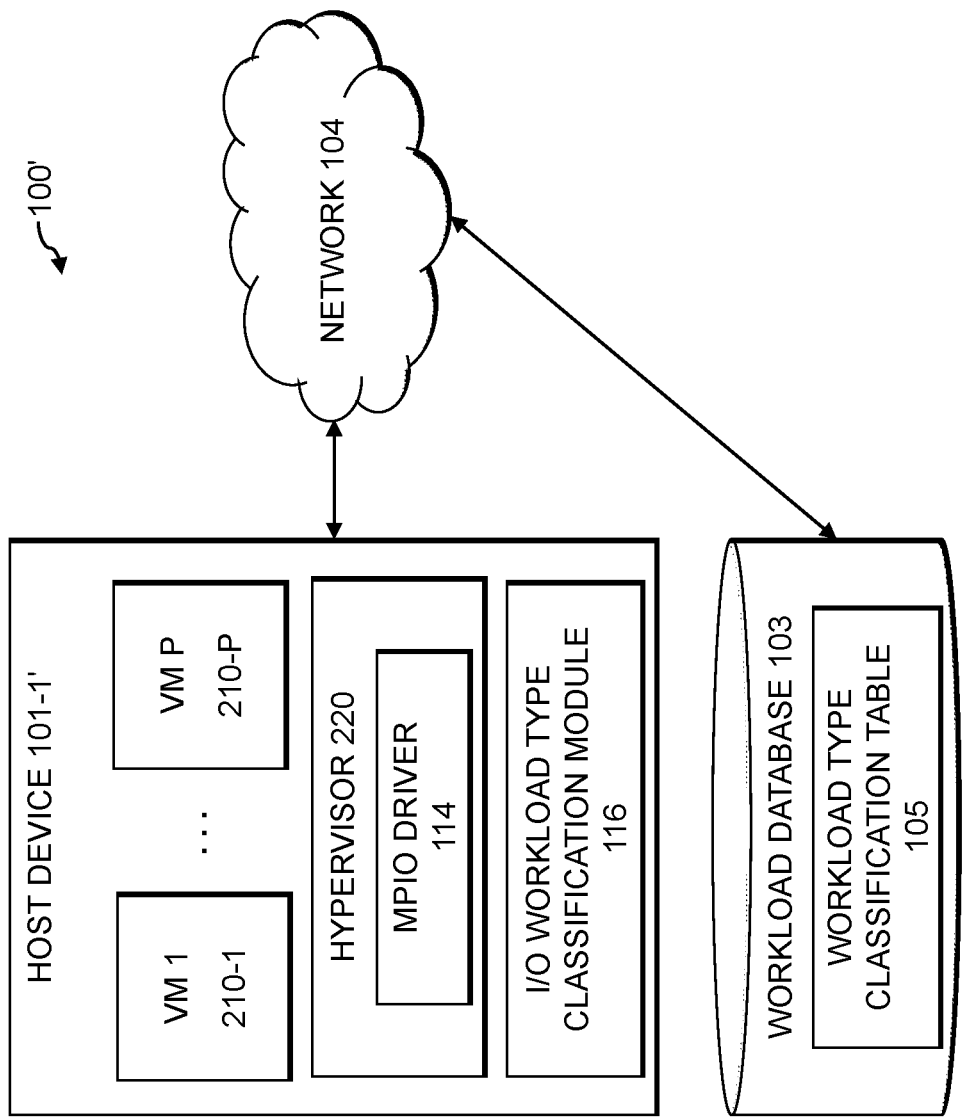
FIG. 2 illustrates a variation of a portion of the information processing system of FIG. 1, according to some embodiments of the disclosure.

FIG. 2 illustrates a variation 100' of a portion of the information processing system 100 of FIG. 1, according to some embodiments of the disclosure. In the example of FIG.

2, the representative host device 101-1' comprises a server running multiple virtual machines 210-1 through 210-P through a hypervisor 220. The hypervisor 220 comprises the MPIO driver 114 of FIG. 1 that is configured to control delivery of I/O operations from the host device 101 to the storage system 102 over selected ones of a plurality of paths through the network 104, as described above. The other elements of FIG. 2 are implemented in a similar manner as the embodiment of FIG. 1, as would be apparent to a person of ordinary skill in the art.

In the example of FIG. 2, the workload database 103 comprises a workload type classification table 105 that identifies, for example, a workload type for each application, as discussed further below in conjunction with FIG. 3.

FIG. 3 is a sample table 300 of the workload type classification table 105 to maintain a workload type (e.g., sequential or random workload) corresponding to each of the applications 112 of FIG. 1, according to one or more embodiments of the disclosure. In the embodiment of FIG. 3, the application names (and optionally a file system identifier) are mapped to a corresponding workload type (e.g., sequential or random workload). Various techniques for generating the workload type classification table 105 are discussed further below in conjunction with FIGS. 4-6.

It is noted that for an application having multiple workloads, each workload can be separately classified and the overall classification of the application can be based on one or more rules. For example, an application having some workloads that are random and some workloads that are sequential may be classified as a random workload. Likewise, an application having multiple sequential workloads may be classified as a sequential workload.

Figure 4:
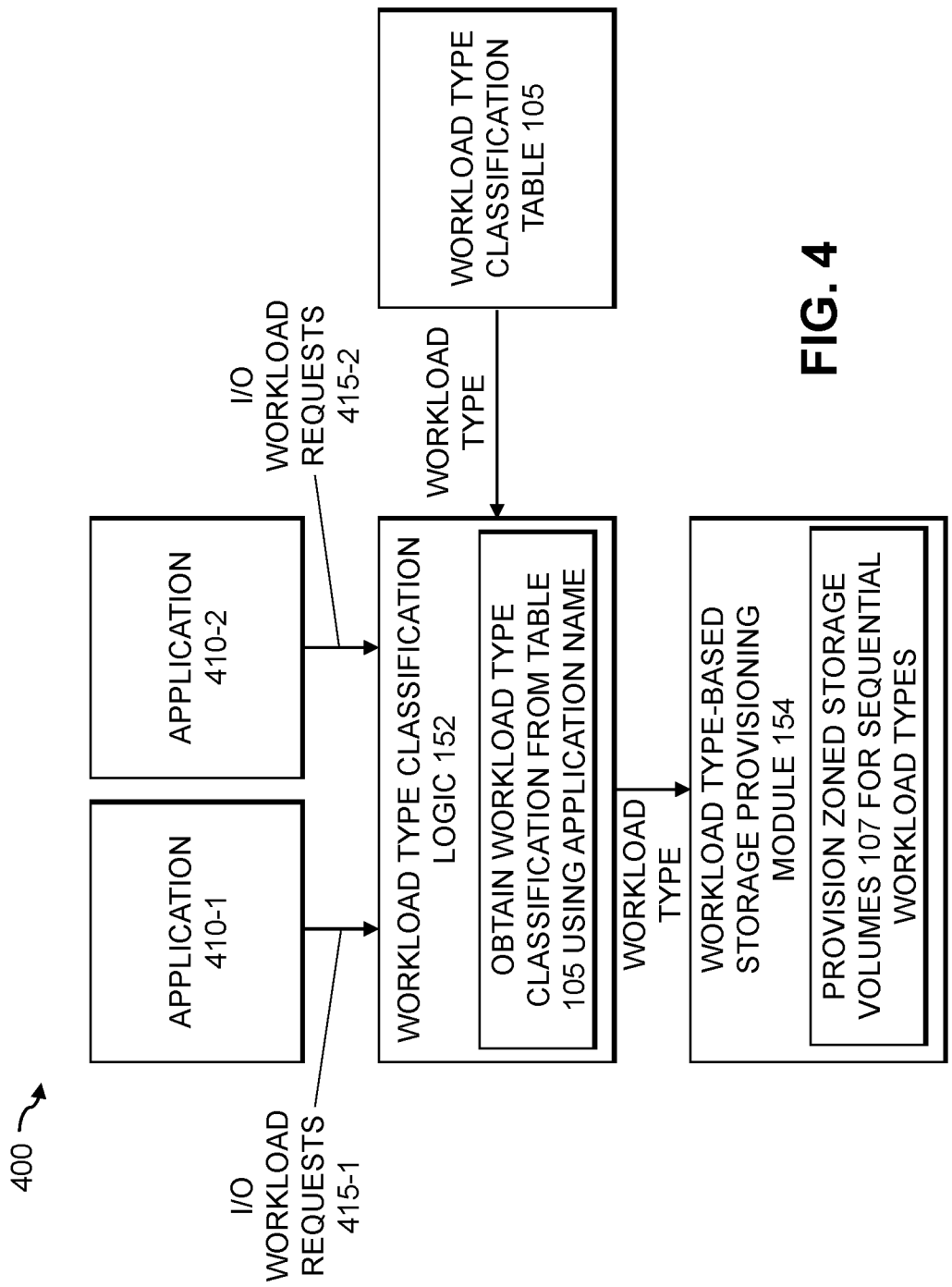
FIG. 4 illustrates a provisioning of storage devices to workloads, where the workload type is classified by evaluating the application name of an application, according to one or more embodiments of the disclosure.

FIG. 4 illustrates a provisioning 400 of storage devices to workloads, where the workload type is classified by evaluating the application name of an application, according to one or more embodiments of the disclosure. In the example of FIG. 4, two exemplary applications 410-1 and 410-2 generate I/O workload requests 415-1 and 415-2, respectively. One or more aspects of the disclosure recognize that some applications may access a storage system in a sequential manner, while other applications might access a storage system in a random manner. Many applications and corresponding file types can be associated with particular sequentiality characteristics. For example, image, audio and video processing applications typically process file content sequentially, while many database applications process data randomly. In addition, log structured applications and file systems also tend to process file content sequentially.

The workload type classification is performed in at least some embodiments by the workload type classification logic 152 of the management system 150. As shown in FIG. 4, the exemplary workload type classification logic 152 obtains the workload type by accessing the workload type classification table 105 (FIG. 3), which has previously stored the workload type for each application, identified by an application name. In this manner, the known application name can be used to perform a look-up of the workload type for each application by the workload type classification logic 152 in the workload type classification table 105. In some embodiments, the application name can be identified by its application command/process name or its process name through a process data structure.

For additional details about techniques for detecting an application type based on the name of an application, see, e.g., U.S. Pat. No. 10,474,367, entitled "Storage System with Input-Output Performance Control Utilizing Application Process Detection," incorporated by reference herein in its entirety.

Thereafter, as shown in FIG. 4, the workload type-based storage provisioning module 154 of the management system 150 can use the determined workload type, at least in some embodiments, to provision zoned storage volumes 107 for workloads that are classified as having a sequential workload type.

It is noted that in at least some embodiments, an application 112 may comprise one or more processes, and each process generates a corresponding workload that is stored on a corresponding storage volume.

Figure 5:
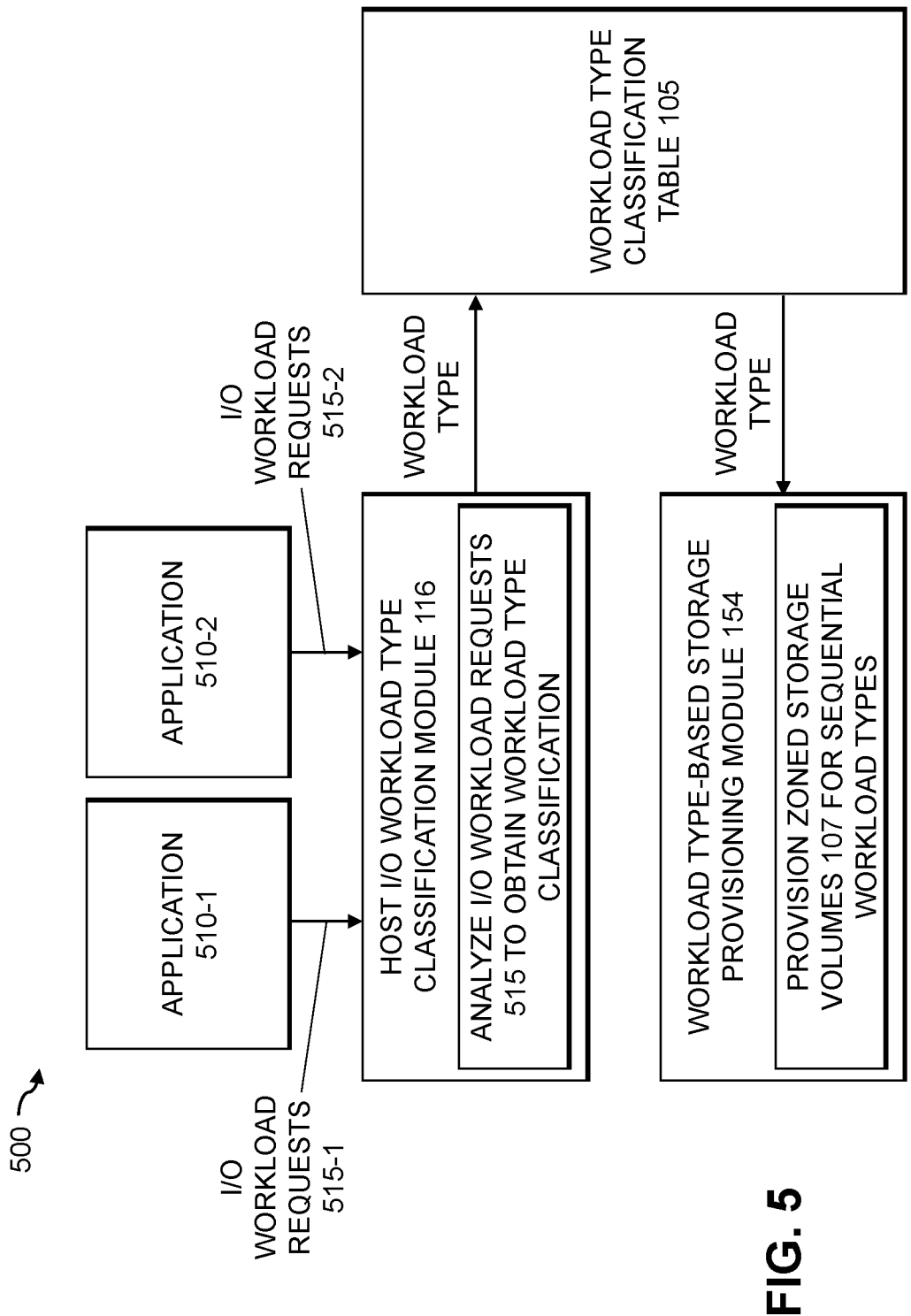
FIG. 5 illustrates a provisioning of storage devices to workloads, where the workload type is classified by analyzing input/output workload patterns, according to some embodiments.

FIG. 5 illustrates a provisioning 500 of storage devices to workloads, where the workload type is classified by analyzing I/O workload patterns, such as sequential workloads or random workloads, according to some embodiments. One or more aspects of the disclosure recognize that the workload type can be determined by a module in the I/O path.

In one or more embodiments, an I/O workload is processed to determine how applications traverse the address space of a storage system. For example, the I/O workload may comprise I/O traces that indicate a type of I/O operation that an application issued (e.g., read or write), a size of the operation, a timestamp associated with the operation, and an indication of an address in the storage addressable space.

In at least some embodiments, a sequential IO pattern, for example, can be detected by analyzing the I/O start and end sectors. The start sector of a subsequent I/O operation should be the sector following the end sector of the prior I/O operation (e.g., next sequential sector=current sector+number of sectors). If the data is arriving in sequence, then the number of sectors arriving sequentially can be summed for a LUN. If the data is arriving out of sequence, then the number of sectors arriving randomly can be summed for a LUN. A percentage of sequential sectors can be determined and compared to a defined threshold. If an application exhibits a sequential type of workload over a specified time, the application workload can be classified as a sequential workload type.

In the example of FIG. 5, two exemplary applications 510-1 and 510-2 generate I/O workload requests 515-1 and 515-2, respectively. The I/O workload type classification module 116 in the host device 101 analyzes the I/O workload requests 515 of each application 510 to obtain a workload type classification (e.g., by evaluating the start and end sectors of each I/O operation). The I/O workload type classification module 116 stores the determined workload type classification in the workload type classification table 105.

Thereafter, as shown in FIG. 5, the workload type-based storage provisioning module 154 of the management system 150 can obtain the workload type from the workload type classification table 105 to provision zoned storage volumes 107 for workloads that are classified as having a sequential workload type. In addition, if a LUN is already provisioned to a particular application, the workload type-based storage provisioning module 154 may automatically switch or transfer the data for the particular application to a zoned LUN (e.g., as part of a migration), to better utilize the ZNS characteristic and achieve better performance (e.g., optimal performance).

It is noted that for an application having multiple workloads, the I/O workload requests 515 of each workload can be separately classified and the overall classification of the application can be based on one or more rules, as noted above. For example, an application having some workloads that are random and some workloads that are sequential may be classified as a random workload. Likewise, an application having multiple sequential workloads may be classified as a sequential workload.

Figure 6:
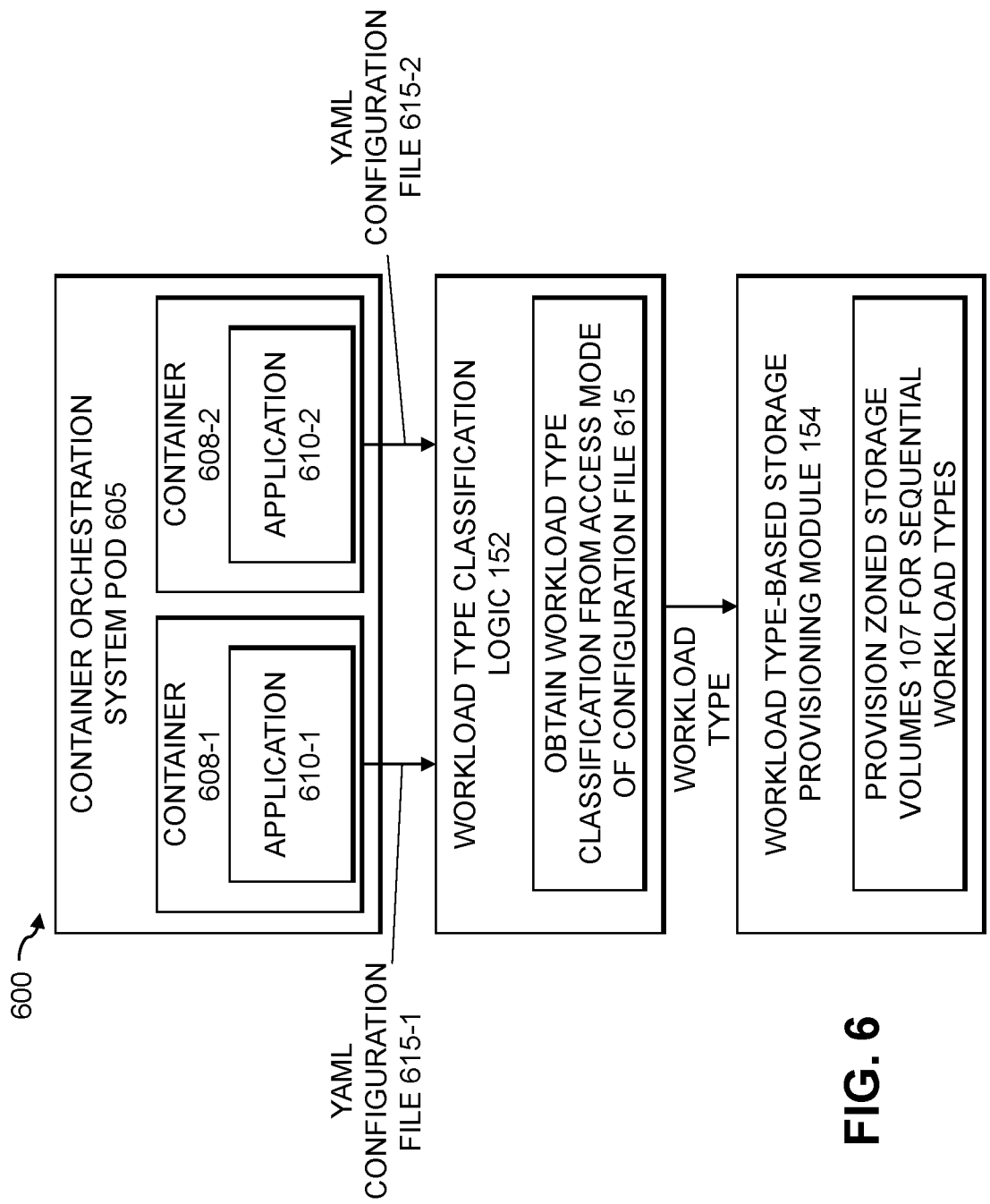
FIG. 6 illustrates a provisioning of storage devices to workloads, where the workload type is classified by detecting an application access mode to persistent volumes, according to some embodiments.

FIG. 6 illustrates a provisioning 600 of storage devices to workloads, where the workload type is classified by detecting an application access mode to persistent volumes, such as a sequential write access mode, according to some embodiments. In the example of FIG. 6, a container orchestration system pod 605, such as a Kubernetes pod maintained by the Cloud Native Computing Foundation, comprises two containers 608-1 and 608-2 that execute two exemplary applications 610-1 and 610-2 that generate a configuration file 615-1 and 615-2, respectively, in addition to generating I/O workload requests. In some embodiments, the configuration files 615 are implemented as YAML ("YAML Ain't Markup Language") configuration files.

The workload type classification is performed by the workload type classification logic 152 of the management system 150. As shown in FIG. 6, the exemplary workload type classification logic 152 obtains the workload type by accessing the access mode of each application in the respective configuration files 615. For example, in some embodiments, the access mode can have the following possible values: be read once, write once, sequential write, random write.

A zoned persistent volumes chunk can be created by reading zoning information from block storage devices. For example, in Kubernetes, an administrator can create persistent volumes, that can be later claimed by any container 608 through a persistent volume claim (PVC). Persistent volumes comprise a chunk of storage LUNs. Generally, persistent volumes abstract details of how storage is provided and how it is consumed. Read and write requests to storage devices are placed in a queue known as a request queue. For example, zone information for a storage device will be available in a request_queue in the Linux operating system. From the zone information, a group of zoned LUNs can be created and this information is given to a persistent volume creation module. Zoned PVs can be created out of these LUNs.

Thus. while claiming a persistent volume through a PVC, the access mode of an application can be checked to determine if the application has a sequential write workload.

Thereafter, as shown in FIG. 6, the workload type-based storage provisioning module 154 of the management system 150 can use the determined workload type to provision zoned storage volumes 107 (e.g., a zoned namespace persistent volume) for workloads that are classified as having a sequential workload type.

Figure 7:
FIG. 7 is a flow chart illustrating an exemplary implementation of a zoned storage device provisioning process that provisions zoned storage devices to sequential workloads, according to an exemplary embodiment of the disclosure.

FIG. 7 is a flow chart illustrating an exemplary implementation of a ZSD provisioning process 700 that provisions ZSDs to sequential workloads, according to an exemplary embodiment of the disclosure. As shown in FIG. 7, the exemplary ZSD provisioning process 700 initially obtains a sequentiality classification of at least one workload of an application associated with a storage system comprising a plurality of ZSDs in step 705. In various embodiments, the sequentiality classification of the at least one workload is obtained by (i) evaluating the application name and/or application type of an application (e.g., in the workload type classification table 105, as discussed above in conjunction with FIG. 4), (ii) analyzing I/O workload patterns in the I/O path, as discussed above in conjunction with FIG. 5, and/or (iii) detecting an application access mode to persistent volumes as discussed above in conjunction with FIG. 6.

Thereafter, in step 710, the ZSD provisioning process 700 provisions at least one zoned storage device for storing the data of the at least one workload in response to the at least one workload being classified as a sequential workload.

In some embodiments, ZSDs are provisioned to sequential workloads, where the workload type is classified by (i) evaluating the application name and/or application type of an application, (ii) analyzing I/O workload patterns in the I/O path, and/or (iii) detecting an application access mode to persistent volumes.

In one or more embodiments, a pool of ZSDs is maintained, sequential workloads are identified and ZSDs are automatically provisioned only to applications having sequential workloads.

The particular processing operations and other network functionality described in conjunction with the flow diagram of FIG. 7 are presented by way of illustrative example only, and should not be construed as limiting the scope of the disclosure in any way. Alternative embodiments can use other types of processing operations to provision ZSDs to sequential workloads. For example, the ordering of the process steps may be varied in other embodiments, or certain steps may be performed concurrently with one another rather than serially. In one aspect, the process can skip one or more of the actions. In other aspects, one or more of the actions are performed simultaneously. In some aspects, additional actions can be performed.

By utilizing the above-described zoned storage provisioning techniques, ZSDs are automatically provisioned to sequential workloads. These features allow the storage system 102 to provide efficient provisioning of ZSDs based on workload types of applications or virtual machines.

One or more embodiments of the disclosure provide improved methods, apparatus and computer program products for provisioning ZSDs to sequential workloads. The foregoing applications and associated embodiments should be considered as illustrative only, and numerous other embodiments can be configured using the techniques disclosed herein, in a wide variety of different applications.

It should also be understood that the disclosed zoned storage provisioning techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for provisioning ZSDs to sequential workloads may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a Platform-as-a-Service (PaaS) offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based zoned storage provisioning engine, or portions thereof, are illustratively implemented for use by tenants of such a multi-tenant environment.

Cloud infrastructure as disclosed herein can include cloud-based systems such as Amazon Web Services (AWS), Google Cloud Platform (GCP) and Microsoft Azure. Virtual machines provided in such systems can be used to implement at least portions of a cloud-based zoned storage provisioning platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 8 and 9. These platforms may also be used to implement at least portions of other information processing systems in other embodiments.

Figure 8:
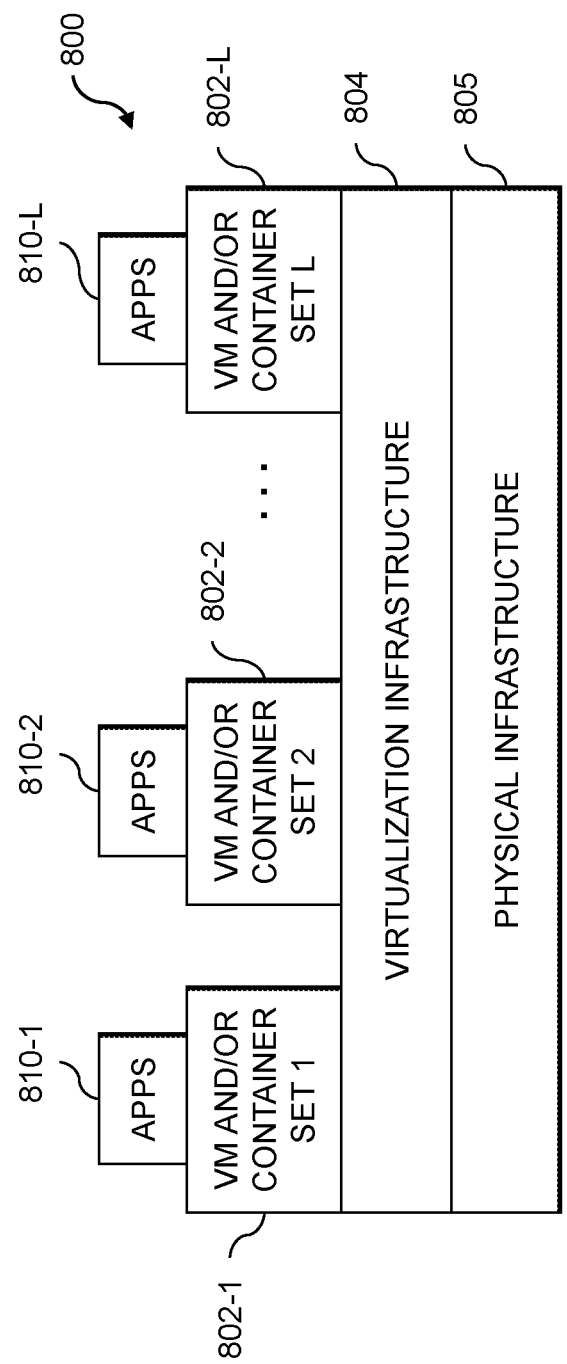
FIG. 8 illustrates an exemplary processing platform that may be used to implement at least a portion of one or more embodiments of the disclosure comprising a cloud infrastructure.

FIG. 8 shows an example processing platform comprising cloud infrastructure 800. The cloud infrastructure 800 comprises a combination of physical and virtual processing resources that may be utilized to implement at least a portion of the information processing system 100. The cloud infrastructure 800 comprises multiple virtual machines (VMs) and/or container sets 802-1, 802-2, . . . 802-L implemented using virtualization infrastructure 804. The virtualization infrastructure 804 runs on physical infrastructure 805, and illustratively comprises one or more hypervisors and/or operating system level virtualization infrastructure. The operating system level virtualization infrastructure illustratively comprises kernel control groups of a Linux operating system or other type of operating system.

The cloud infrastructure 800 further comprises sets of applications 810-1, 810-2, . . . 810-L running on respective ones of the VMs/container sets 802-1, 802-2, . . . 802-L under the control of the virtualization infrastructure 804. The VMs/container sets 802 may comprise respective VMs, respective sets of one or more containers, or respective sets of one or more containers running in VMs.

In some implementations of the FIG. 8 embodiment, the VMs/container sets 802 comprise respective VMs implemented using virtualization infrastructure 804 that comprises at least one hypervisor. Such implementations can provide zoned storage provisioning functionality of the type described above for one or more processes running on a given one of the VMs. For example, each of the VMs can implement zoned storage provisioning control logic and associated workload type classification tables for providing workload type-based storage provisioning functionality for one or more processes running on that particular VM.

An example of a hypervisor platform that may be used to implement a hypervisor within the virtualization infrastructure 804 is the VMware® vSphere® which may have an associated virtual infrastructure management system such as the VMware® vCenter™. The underlying physical machines may comprise one or more distributed processing platforms that include one or more storage systems.

In other implementations of the FIG. 8 embodiment, the VMs/container sets 802 comprise respective containers implemented using virtualization infrastructure 804 that provides operating system level virtualization functionality, such as support for Docker containers running on bare metal hosts, or Docker containers running on VMs. The containers are illustratively implemented using respective kernel control groups of the operating system. Such implementations can provide zoned storage provisioning functionality of the type described above for one or more processes running on different ones of the containers. For example, a container host device supporting multiple containers of one or more container sets can implement one or more instances of zoned storage provisioning control logic and associated workload type classification tables for providing workload type-based storage provisioning functionality.

As is apparent from the above, one or more of the processing modules or other components of system 100 may each run on a computer, server, storage device or other processing platform element. A given such element may be viewed as an example of what is more generally referred to herein as a "processing device." The cloud infrastructure 800 shown in FIG. 8 may represent at least a portion of one processing platform. Another example of such a processing platform is processing platform 900 shown in FIG. 9.

The processing platform 900 in this embodiment comprises at least a portion of the given system and includes a plurality of processing devices, denoted 902-1, 902-2, 902-3, . . . 902-K, which communicate with one another over a network 904. The network 904 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 902-1 in the processing platform 900 comprises a processor 910 coupled to a memory 912. The processor 910 may comprise a microprocessor, a microcontroller, an application specific integrated circuit (ASIC), a field programmable gate array (FPGA) or other type of processing circuitry, as well as portions or combinations of such circuitry elements, and the memory 912, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 902-1 is network interface circuitry 914, which is used to interface the processing device with the network 904 and other system components, and may comprise conventional transceivers.

The other processing devices 902 of the processing platform 900 are assumed to be configured in a manner similar to that shown for processing device 902-1 in the figure.

Again, the particular processing platform 900 shown in the figure is presented by way of example only, and the given system may include additional or alternative processing platforms, as well as numerous distinct processing platforms in any combination, with each such platform comprising one or more computers, storage devices or other processing devices.

Figure 9:
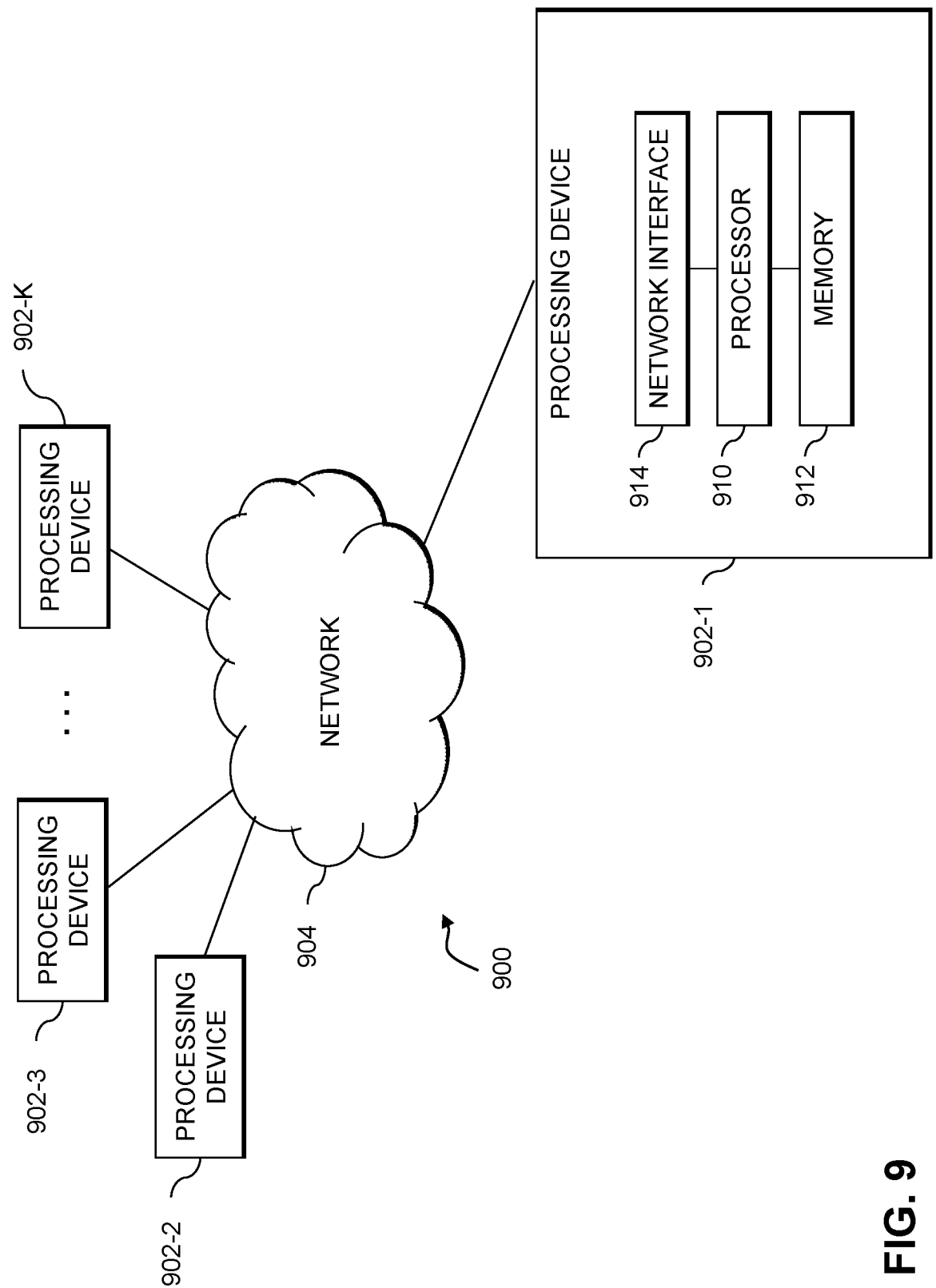
FIG. 9 illustrates another exemplary processing platform that may be used to implement at least a portion of one or more embodiments of the disclosure.

Multiple elements of an information processing system may be collectively implemented on a common processing platform of the type shown in FIG. 8 or 9, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only.

Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
obtaining a sequentiality classification, determined by at least one host device, of at least one workload of an application, wherein the application is executed by the at least one host device and is associated with a storage system comprising a plurality of zoned storage devices, and wherein the sequentiality classification characterizes a sequentiality of input/output (I/O) operations of the at least one workload; and
automatically provisioning, in response to an occurrence of an event, at least one zoned storage device of the plurality of zoned storage devices to store data of the at least one workload, wherein the event comprises the at least one workload being classified as a sequential workload, wherein the classification of the at least one workload as a sequential workload is based at least in part on an evaluation of a sequential I/O pattern of a plurality of I/O operations, wherein the evaluation of the sequential I/O pattern of the plurality of I/O operations comprises evaluating at least one of a start sector and an end sector of a first I/O operation and at least one of a start sector and an end sector of a subsequent I/O operation, wherein the at least one zoned storage device comprises one or more storage devices having an address space comprising a plurality of zones and wherein each zone is written sequentially;
wherein the method is performed by at least one processing device comprising a processor coupled to a memory.

2. The method of claim 1, wherein the plurality of zoned storage devices comprises one or more zoned storage volumes, wherein the application comprises one or more processes each associated with a given one of the at least one workload and wherein the data associated with a given workload is stored on a corresponding one of the one or more zoned storage volumes.

3. The method of claim 1, wherein the sequentiality classification of the at least one workload classifies the at least one workload as a sequential workload or a random workload.

4. The method of claim 1, wherein the sequentiality classification of the at least one workload is based at least in part on an evaluation of sectors, of the plurality of I/O operations, arriving sequentially relative to one or more sequentiality criteria.

5. The method of claim 1, wherein the sequentiality classification of the at least one workload is obtained based at least in part on one or more of: (i) a name of the application, (ii) an application type of the application, (iii) a monitoring of the at least one workload in an input/output path, and (iv) an access mode of the at least one workload to persistent storage volumes obtained from a configuration file associated with the application.

6. The method of claim 1, wherein the at least one zoned storage device is obtained from a pool of zoned storage devices.

7. The method of claim 1, wherein the provisioning is performed by a provisioning device of a storage environment comprising the at least one zoned storage device.

8. An apparatus comprising:
at least one processing device comprising a processor coupled to a memory;
the at least one processing device being configured to implement the following steps:
obtaining a sequentiality classification, determined by at least one host device, of at least one workload of an application, wherein the application is executed by the at least one host device and is associated with a storage system comprising a plurality of zoned storage devices, and wherein the sequentiality classification characterizes a sequentiality of input/output (I/O) operations of the at least one workload; and
automatically provisioning, in response to an occurrence of an event, at least one zoned storage device of the plurality of zoned storage devices to store data of the at least one workload, wherein the event comprises the at least one workload being classified as a sequential workload, wherein the classification of the at least one workload as a sequential workload is based at least in part on an evaluation of a sequential I/O pattern of a plurality of I/O operations, wherein the evaluation of the sequential I/O pattern of the plurality of I/O operations comprises evaluating at least one of a start sector and an end sector of a first I/O operation and at least one of a start sector and an end sector of a subsequent I/O operation, wherein the at least one zoned storage device comprises one or more storage devices having an address space comprising a plurality of zones and wherein each zone is written sequentially.

9. The apparatus of claim 8, wherein the plurality of zoned storage devices comprises one or more zoned storage volumes, wherein the application comprises one or more processes each associated with a given one of the at least one workload and wherein the data associated with a given workload is stored on a corresponding one of the one or more zoned storage volumes.

10. The apparatus of claim 8, wherein the sequentiality classification of the at least one workload classifies the at least one workload as a sequential workload or a random workload.

11. The apparatus of claim 8, wherein the sequentiality classification of the at least one workload is based at least in part on an evaluation of sectors, of the plurality of I/O operations, arriving sequentially relative to one or more sequentiality criteria.

12. The apparatus of claim 8, wherein the sequentiality classification of the at least one workload is obtained based at least in part on one or more of: (i) a name of the application, (ii) an application type of the application, (iii) a monitoring of the at least one workload in an input/output path, and (iv) an access mode of the at least one workload to persistent storage volumes obtained from a configuration file associated with the application.

13. The apparatus of claim 8, wherein the provisioning is performed by a provisioning device of a storage environment comprising the at least one zoned storage device.

14. A non-transitory processor-readable storage medium having stored therein program code of one or more software programs, wherein the program code when executed by at least one processing device causes the at least one processing device to perform the following steps:
obtaining a sequentiality classification, determined by at least one host device, of at least one workload of an application, wherein the application is executed by the at least one host device and is associated with a storage system comprising a plurality of zoned storage devices, and wherein the sequentiality classification characterizes a sequentiality of input/output (I/O) operations of the at least one workload; and
automatically provisioning, in response to an occurrence of an event, at least one zoned storage device of the plurality of zoned storage devices to store data of the at least one workload, wherein the event comprises the at least one workload being classified as a sequential workload, wherein the classification of the at least one workload as a sequential workload is based at least in part on an evaluation of a sequential I/O pattern of a plurality of I/O operations, wherein the evaluation of the sequential I/O pattern of the plurality of I/O operations comprises evaluating at least one of a start sector and an end sector of a first I/O operation and at least one of a start sector and an end sector of a subsequent I/O operation, wherein the at least one zoned storage device comprises one or more storage devices having an address space comprising a plurality of zones and wherein each zone is written sequentially.

15. The non-transitory processor-readable storage medium of claim 14, wherein the plurality of zoned storage devices comprises one or more zoned storage volumes, wherein the application comprises one or more processes each associated with a given one of the at least one workload and wherein the data associated with a given workload is stored on a corresponding one of the one or more zoned storage volumes.

16. The non-transitory processor-readable storage medium of claim 14, wherein the sequentiality classification of the at least one workload is based at least in part on an evaluation of sectors, of the plurality of I/O operations, arriving sequentially relative to one or more sequentiality criteria.

17. The non-transitory processor-readable storage medium of claim 14, wherein the sequentiality classification of the at least one workload is obtained based at least in part on one or more of: (i) a name of the application, (ii) an application type of the application, (iii) a monitoring of the at least one workload in an input/output path, and (iv) an access mode of the at least one workload to persistent storage volumes obtained from a configuration file associated with the application.

18. The non-transitory processor-readable storage medium of claim 14, wherein the at least one zoned storage device is obtained from a pool of zoned storage devices.

19. The non-transitory processor-readable storage medium of claim 14, wherein the provisioning is performed by a provisioning device of a storage environment comprising the at least one zoned storage device.

20. The method of claim 1, further comprising migrating at least one data item of the at least one workload of the application from at least one non-zoned storage device to the at least one zoned storage device in response to the at least one workload being classified as the sequential workload.

* * * * *